United States Patent [19]

Ohtani et al.

[11] 4,420,685
[45] Dec. 13, 1983

[54] METHOD AND EQUIPMENT FOR DETECTING TOOL FAILURE

[75] Inventors: Tamio Ohtani, Kawasaki; Yasuhiko Kanaya, Machida, both of Japan

[73] Assignee: Hitachi Seiko, Ltd., Tokyo, Japan

[21] Appl. No.: 235,580

[22] Filed: Feb. 18, 1981

[30] Foreign Application Priority Data

Aug. 24, 1979 [JP] Japan .................................. 54-115795

[51] Int. Cl.³ ............................................. G01V 9/04
[52] U.S. Cl. .............................. 250/222.2; 250/223 R; 408/6
[58] Field of Search ................................ 408/7, 16, 6; 250/222 R, 222 PC, 223 R, 561; 235/92 V, 92 PC, 92 PD

[56] References Cited

U.S. PATENT DOCUMENTS

| | | | |
|---|---|---|---|
| 3,184,725 | 5/1965 | Siegel et al. | 235/92 PD |
| 3,345,812 | 10/1967 | Pickering | 250/561 |
| 3,648,054 | 3/1972 | Nance | 235/92 V |
| 3,927,400 | 12/1975 | Knepler | 250/222 PC |
| 4,038,982 | 8/1977 | Burke et al. | 250/222 PC |

*Primary Examiner*—David C. Nelms
*Attorney, Agent, or Firm*—Antonelli, Terry & Wands

[57] ABSTRACT

In a machine tool, a tool failure detection equipment in which chips or particles resulting from the machining of a work are collected and whether the tool is intact or broken is detected from the quantity of collected chips or particles. Chips or particles are sucked by a suction means and the quantity of collected chips or particles is detected by an optical detecting means. When the detected quantity is less than a predetermined value, the tool is detected as being broken.

7 Claims, 6 Drawing Figures

METHOD AND EQUIPMENT FOR DETECTING TOOL FAILURE

BACKGROUND OF THE INVENTION

The present invention relates to a method and equipment for detecting whether or not a tool of a machine tool is broken from the quantity of collected chips or particles.

In this specification the term "machining tools" is used to refer to various types and kinds of tools used in machine tools such as cutting tools, milling tools, drilling tools and so on.

There have been devised and demonstrated various methods for detecting tool failures. According to one prior art method, the current flowing to a motor for spinning a tool is detected and when an armature current drops a predetermined level; that is, the level of current at which a normal machining operation is carried out, a tool is detected as being broken. However, in the case of machining of soft works such as epoxy resins, bakelite, woods or soft metals, the difference in torque of the motor between a machining step and a non-machining or nonloaded period is very small so that the correct detection of a tool is very difficult.

SUMMARY OF THE INVENTION

In view of the above, the present invention has for its object to provide a method and equipment for correctly detecting a tool failure even in a machine tool in which the difference between machining and non-loaded torques is very small.

The present invention is based on the observed fact that when the cutting speed is constant or when a large number of holes are drilled in a work of a uniform thickness, a predetermined quantity of chips or particles is produced when a tool is intact, but when a tool is broken or crumbled, the quantity of chips or particles decreases. The present invention provides therefore a means for detecting the quantity of chips or particles collected by suction, for instance. More specifically, a dust collector sucks chips or particles through a duct in which an optical detection means for detecting the quantity of chips or particles being collected or sucked is inserted.

According to the present invention, whether or not a tool is broken is detected from the quantity of chips or particles resulting from each machining step. Thus the present invention provides a tool failure detection equipment which can substantially eliminate detection errors.

DETAILED DESCRIPTION OF THE PREFERRED EMBODIMENT

Figure 1:
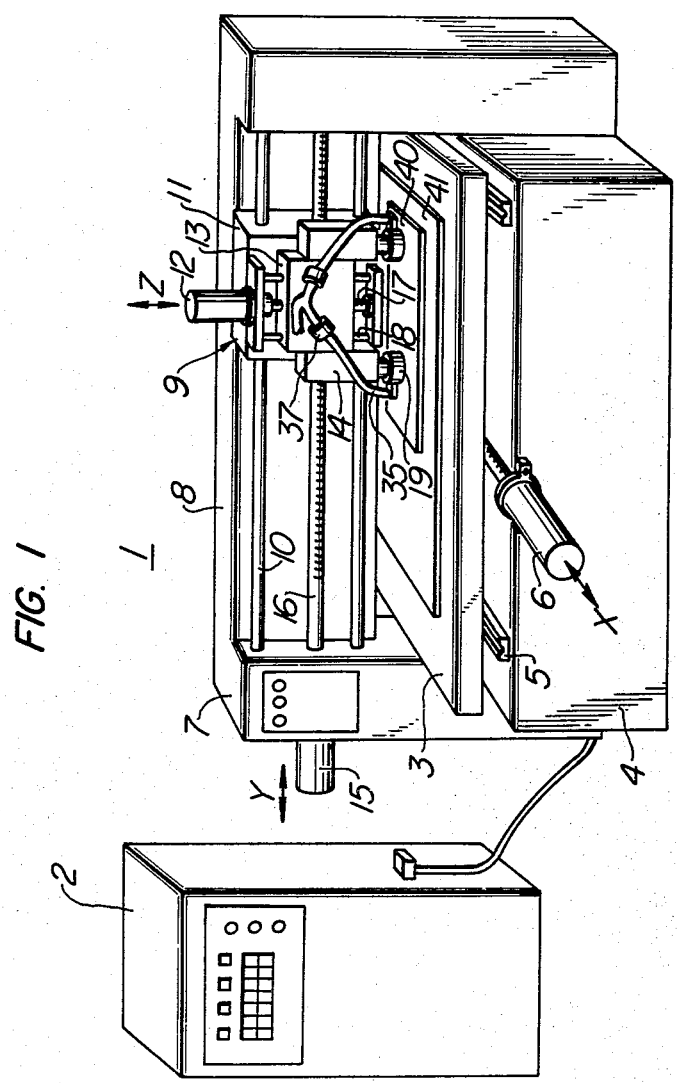
FIG. 1 is a perspective view of a machine tool equipped with a tool failure detection equipment in accordance with the present invention.
Figure 2:
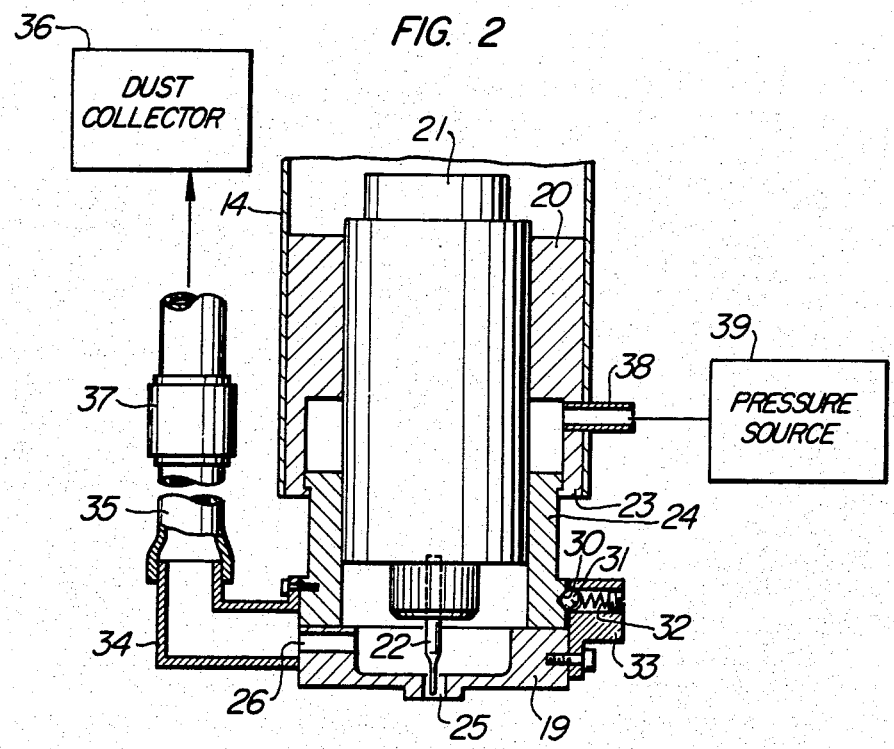
FIG. 2 is a front vertical sectional view, on enlarged scale, of a portion of the machine tool shown in FIG. 1.
Figure 3:
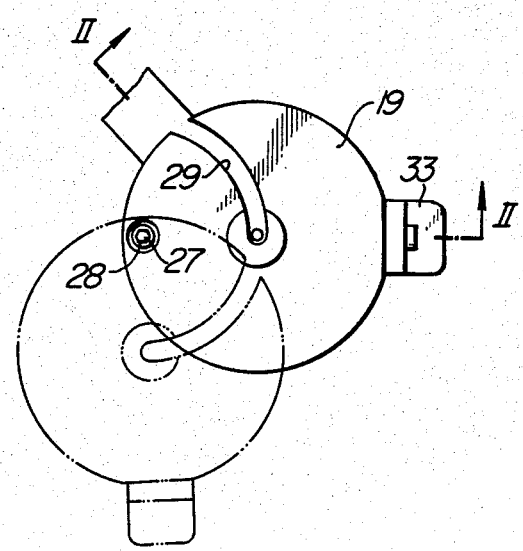
FIG. 3 is a bottom view of FIG. 2.

FIG. 1 shows in perspective view a machining tool failure detection equipment in accordance with the present invention and more particularly a machine for drilling or piercing holes in printed circuit boards. FIG. 2 is a front vertical sectional view, on enlarged scale, of a machining tool holder thereof, and FIG. 3 is a bottom view thereof.

1 is a machine tool with a machining tool or a drill failure detection equipment, such as a machine for drilling holes in printed circuit boards. 2 is a control unit for controlling the machine tool 1. 3 is a table which is slidable along guide rails 5 which, in turn, are mounted on the top of a base 4. The table 3 is drivingly coupled to a driving motor 6 (to be referred to as the "X-axis motor" in the specification) so that the position or feed of the table 3 in the X-axis direction may be controlled. 7 is a double housing type column with a top beam 8 bridging the columns above the table 3. 9 is a tool head comprising a cross head 11 slidable along two parallel cross rails 10 bridging between the columns, a Z-axis feed motor 12 mounted on the cross head 11, a saddle 13 and a tool portion 14. 15 is a Y-axis motor. 16 is an Y-axis feed rod. The rotation of the Y-axis motor 15 is transmitted through the Y-axis feed rod 16 to the cross head 11 so as to control its Y-axis position or feed. The saddle 13 is operatively coupled to the Z-axis motor 12 mounted on the cross head 11 through a Z-axis feed rod 17 and is movable along two parallel vertical guide rods 18 so that, upon rotation of the Z-axis feed motor 12, the position or feed of the saddle 13 in the Z-axis direction or vertical direction can be controlled. 19 is a work holder disposed under the lower end of the tool portion 14.

Next, referring particularly to FIG. 2, 20 is a bracket rigidly secured to the saddle 13. 21 is a spindle rotatably received by the bracket 20. 22 is a drill held at the lower end of the spindle 21. 23 is a cylinder securely joined to the lower end of the bracket 20. 24 is a hollow cylindrical moving member (quill) disposed for vertical slidable movement along the outer cylindrical surface of the spindle 21 within the cylinder 23 and the inner cylindrical surface of the cylinder 23. The moving member 24 embraces the drill 22. 25 is a through hole through which the drill 22 passes. 26 is a suction hole opened adjacent to the drill shank for sucking chips. 27 (FIG. 3) is a bolt with which the work holder 19 is eccentrically pivoted to the lower end of the sliding or moving quill member 24. 28 is a spring loaded between the bolt 27 and the sliding or moving member 24. 29 is an arcuate groove which is formed in the undersurface of the work holder 19 and whose radius is equal to the distance between the axis of the drill 22 or the through hole 25 and the axis of the bolt 27. 33 is a retaining means which is mounted on the outer cylindrical surface of the work holder 19 for securely retaining the work holder in a predetermined position (indicated by the solid line circle in FIG. 3) and which comprises a ball 31 and a spring 32 adapted to bias the ball 31 into engagement with a recess 30 formed in the outer cylindrical surface of the sliding or moving member 24. Therefore, when one pushes horizontally on the retaining means 33, in the directions indicated by the double-pointed arrow in FIG. 3, the work holder 19 is displaced between the solid line position and the position indicated by the two-dot chain line, so that the drill 22 is accessible for replacement by the operator.

34 is a connection member one end of which is joined to the outer opening of the suction port 26 of the sliding or moving member 24 and the other end of which is joined to a passage such as a flexible duct 35. The end of the passage 35 remote from the connection member 34 is connected to a dust collector 36 through a chip detector 37 of an optical type, for instance. Instead of the optical chip or particle detector 37, an electrostatic capacitance type or a magnetic type chip or particle detector may be used, but it is preferable to use an optical detector when the works are made of nonmagnetic materials.

38 is a pipe which is communicated with the cylinder 23 for charging a working oil or fluid under pressure from a pressure source 39 to the cylinder 23. It follows therefore that the sliding or moving member 24 is normally pressed downward and against the flange at the lower end of the cylinder 23.

Referring back to FIG. 1, 40 is a work; that is, a printed circuit board held on the table 3 through an intermediate plate or the like 41.

Still referring to FIGS. 1 through 3, the mode of operation will be described. In response to control signals, the working fluid under pressure is charged from the pressure source 39 through the pipe or pressure line 38 into the cylinder 23 so that the sliding or moving member or the quill 24 is forced to move down (and consequently press against the work holder 19). Next the Z-axis motor 12 is energized so that the saddle 13 is lowered and subsequently the lower end of the work holder 19 is forced to press the printed circuit board 40 against the table 3 (through the intermediate plate 41), whereby the printed circuit board 40 is prevented from floating away from the table 3. When the saddle 13 is further lowered, relative movement between the cylinder 23 and the sliding or moving quill member 24 results so that the drill 22 is extended out of the through hole 25 of the work holder 19 and drills a hole in the printed circuit board 40. Chips or particles resulting from the drilling operation are drawn through the arcuate groove 29 and the through hole 25 into the work holder 19 and then sucked therefrom through the connection member 34, the passage 35 and the chip or particle detector 37 into the dust collector 36.

Figure 4:
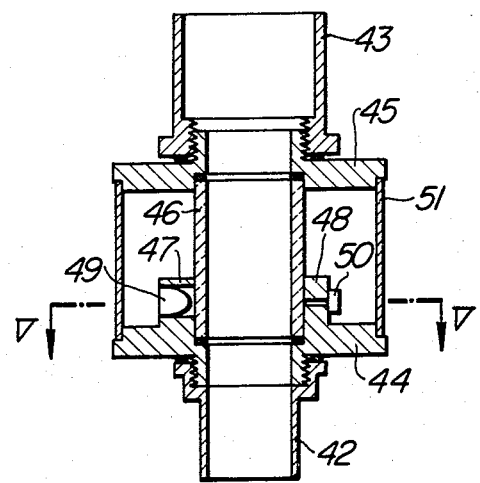
FIG. 4 is a vertical sectional view of a chip or particle detector.
Figure 5:
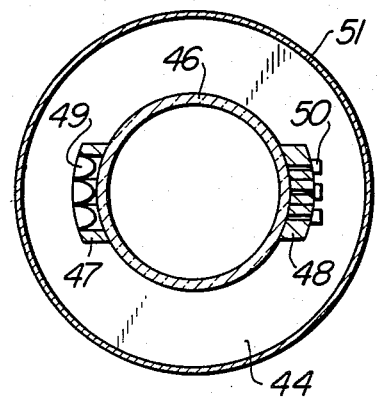
FIG. 5 is a sectional view taken along the line A—A of FIG. 4.

Referring next to FIGS. 4 and 5 the chip or particle detector 37 will be described in detail below. 42 and 43 are joints for connection with the flexible duct 35 and the duct collector 36, respectively. 44 and 45 are a bottom and a cap, respectively, made of aluminum. 46 is a glass tube. These joints 42 and 43, the aluminum cap and bottoms 44 and 45 and the glass tube 46 have the same inner diameter so that they may be aligned. 47 and 48 are a first projection and a second projection, respectively, which are formed integral with the bottom member 44 and extended radially outwardly in such a way they embrace or clamp the glass tube 46 in diametrically opposed relationship. 49 are light emitting elements which are embedded in the first projection 47 in such a way that the light rays emitted from these light emitting elements 49 pass into the glass tube 46. 50 are light sensors which are embedded into the second projection 48 in such a way that they can intercept the light rays emitted from the opposing or corresponding light emitting elements 49 in the first projection 47. 51 is a cylindrical light-shielding member or an outer cylinder which is interposed between the bottom and cap members 44 and 45 coaxially of the glass tube 46 so that the light emitting elements 49 and the light sensors 50 can be isolated from the exterior light.

As the chips or particles pass through the glass tube 46 into the dust collector 36, they scatter the light rays emitted from the light emitting elements 49 so that the intensity of light intercepted by each light sensor 50 varies and consequently the light sensors 50 deliver pulse-like output signals. Thus, in response to the outputs from the light sensors 50, whether or not the air passing through the glass tube 46 entrains the chips or particles and how much or how many numbers of chips or particles the air entrains can be detected. It is not needed, however, to count all the chips or particles passing through the whole cross section of the glass tube 46. In other words, it suffices to arrange a suitable number of light emitting elements 49 and a corresponding number of light sensors 50 in diametrically opposed relationship across the glass tube 46 as shown in FIG. 5.

Figure 6:
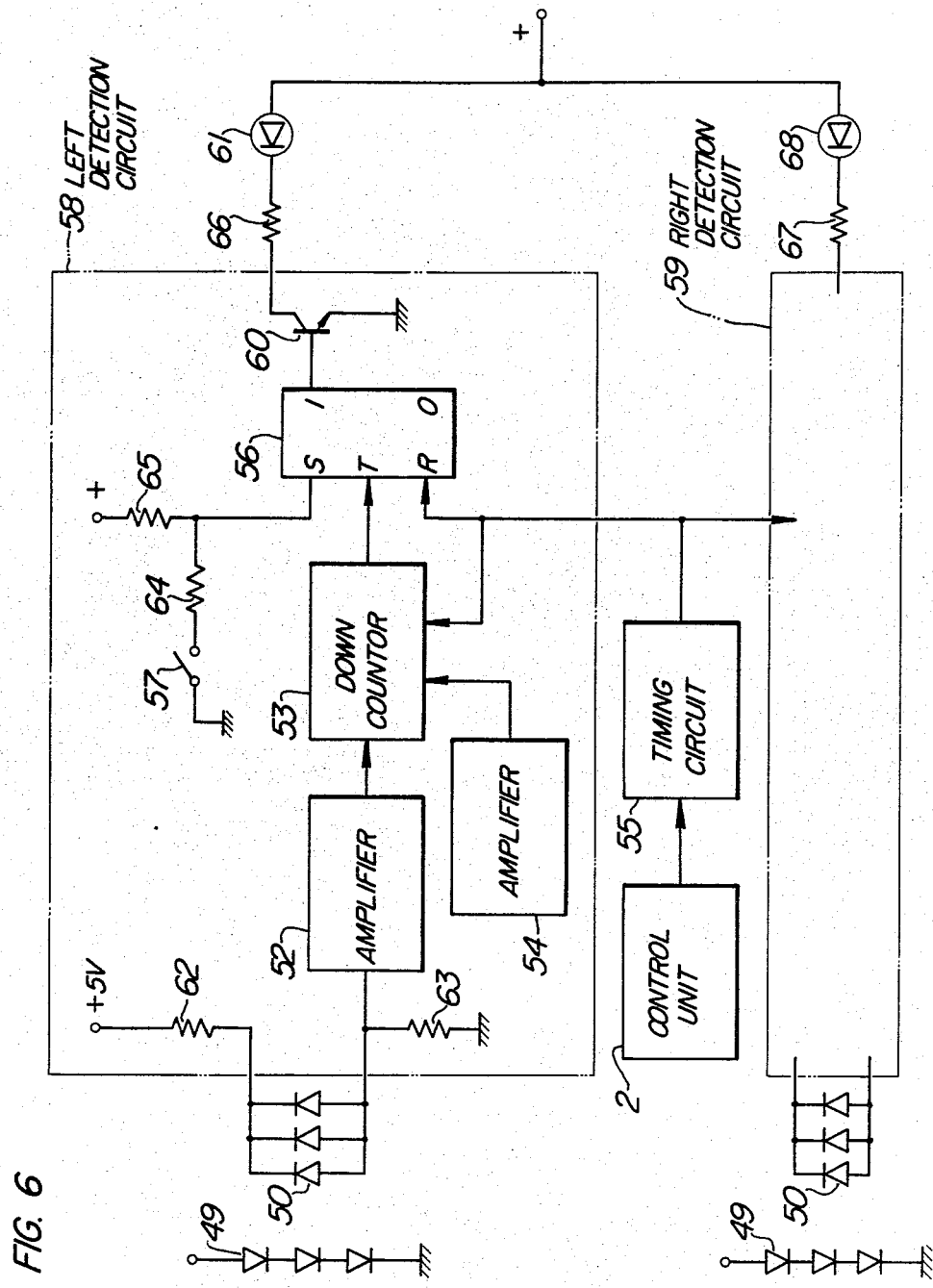
FIG. 6 is an electric circuit diagram of the tool failure detection equipment.

In FIG. 6 is shown an electric or electronic circuit diagram of the machining tool failure detecting equipment. 52 is an amplifier for amplifying the outputs from the light sensors 50. 53 is a down counter for counting in the descending order the output pulses from the amplifier 52. 54 is a digital switch for setting an initial contents in the counter 54. An initial contents in the down counter 53 is changed in response to the setting or load signal from a timing circuit 55. In response to the control signal from the control unit 2; that is, the driving signal applied to the Z-axis motor 12 for lowering the drill 22 (See FIGS. 1 and 2), the timing circuit 55 generates the timing signals the frequency of which is synchronized with that of the driving signal or with a submultiple thereof. 56 is a R.S.T. flip-flop. The set terminal of the flip-flop 56 is connected not only a power supply + through a resistor 65 but also a switch 57 through a resistor 64 in a left detection circuit 58. When only the left drill 22 fastened to the left tool portion 14, an operator manually opens the switch 57. When both the right and left drills 22 are to be used, the operator opens both the switch 57 in the left detection circuit 58 and a corresponding switch (not shown) in a right detection circuit 59. 60 is an inverter which is coupled to the output of the flip-flop 56 and which constitutes a driving switch for a display unit 61. 62 through 67 are resistors. 68 is a display unit for displaying the output from the right detection circuit 59. The display units 61 and 68 may be miniature lamps, semiconductor light emitting elements or buzzers which generate the warning signals to the operator when turned on.

Next the mode of operation of the tool failure detection equipment with the above described construction will be described in detail below. First assume that the drill or tool 22 remains intact; that is, the drill 22 is not broken or crumbled. In response to the control signal from the control unit 2 for lowering the tool portion 14, the timing circuit 55 delivers the reset signal so that the digital switch 54 sets or loads an initial contents in the down counter 53 and concurrently the flip-flop 56 is reset. At this time point, both the pressure source 39 and the dust collector 36 have been already energized or activated. When the tool or drill 22 is lowered and drills a hole in the printed circuit board 40, chips or particles are produced. The resulting chips or particles are collected into the dust collector 36 as described in detail previously. As they pass through the chip or particle detector 37, the light sensors 50 deliver the output pulses as described previously. After having been amplified through the amplifier 52, these pulses are subtracted from the contents in the down counter 53. The results of experiments conducted by the inventors showed that when one hole is drilled, the light sensors 50 deliver 120 pulses. Thus the down counter 53 is initially set to 100. When the 100-th output pulse is delivered from the light sensors 50 to the down counter 53 through the amplifier 52, the counter 53 delivers an output signal to the trigger terminal of the flip-flop 56 so that the display unit 61 is energized to flash. Thus the operator can confirm that the normal drilling operation has been accomplished.

Next assume that the drilling operation is started with a broken drill 22. Then the number of chips or particles passing through the chip or particle detector 37 becomes less. For instance, the chip or particle detector 37 delivers only 0 to 30 output pulses to the down counter 53. As a result, even after the drilling operation has been completed, no output signal is delivered from the down counter 30 to the flip-flop 56 so that the display unit 61 or 68 remains deactivated; that is, it does not flash. As a consequence the operator can confirm that the drilling operation has been accomplished with the broken or otherwise failed drill 22 and subsequently no hole has been drilled.

The output from the flip-flop 56 is used not only for activating or energizing the display unit 61 but also for controlling the X.Y and Z-axis motors and the spindle motor.

The number or quantity of chips or particles in terms of the number of output pulses from the chip or particle detector may be that resulting from drilling only one hole or a predetermined number of holes. If one drilling cycle takes a long time period, the number or quantity of chips or particles must be measured for a predetermined divided time interval. The timing signal required to this end may be provided by dividing the frequency of the output from a clock generator incorporated in the control unit 2.

In summary, according to the present invention, even with a machine tool in which the difference between the machining torque and the unloaded torque is very small, the failures of tools can be positively detected.

What is claimed is:

1. A method for detecting a drill tool failure in a drilling machine characterized by:
    collecting chips or particles resulting from the machining with a drilling tool, and
    collecting chips or particles resulting from the machining with a drilling tool with chip or particle collection means for collecting chips or particles resulting from the drilling of works with the drilling tool, and
    detecting the quantity of collected chips or particles so as to detect whether the drilling tool is intact or broken through use of chip or particle detection means for detecting the quantity of collected chips or particles, whereby whether the drilling tool is intact or broken is detected from the quantity of collected and detected chips or particles.

2. In a drilling machine, a drill tool failure detection equipment characterized by the provision of:
    a drilling tool for drilling works,
    chip or particle collection means for collecting chips or particles resulting from the drilling of works with the drilling tool,
    chip or particle detection means for detecting the quantity of collected chips or particles, whereby whether the drilling tool is intact or broken is detected from the quantity of collected and detected chips or particles.

3. A drilling tool failure detection equipment as set forth in claim 2 further characterized in that
    said chip or particle collection means comprises
    a duct through which the chips or particles are sucked, and
    a suction means which is communicated with said duct and which is provided with a suction source.

4. A drilling tool failure detection equipment as set forth in claim 3 further characterized in that
    said chip or particle detection means is situated as part of said duct, so that particles or chips sucked by said duct will travel through said chip or particle detection means en route to said collection means.

5. A drill failure detection equipment as set forth in claim 2 or 3 or 4 further characterized in that
    said chip or particle detection means comprises an optical detector.

6. In a drilling machine, a drilling tool failure detection equipment characterized by the provision of
    a drilling tool,
    a feed means for moving the drilling tool to or away from a work,
    a work holding means which is provided with a through hole through which said drilling tool is extended toward the work when said drilling tool is moved toward the work and which is provided with a guide means communicated with said through hole,
    a supporting means for supporting said work holding means in such a way that said work holding means in movable in the direction perpendicular to the axis of said drilling tool,
    a small chamber or space defined around said drilling tool by said work holding means,
    a chip or particle collection means comprising a duct communicated with said small chamber or space and a suction source communicated with said duct for collecting chips or particles resulting from the drilling of the work, and chip or particle detection means for detecting the quantity of collected chips or particles, whereby whether the drilling tool is intact or broken is detected from the quantity of collected and detected chips or particles.

7. A drilling machine according to claim 6, further comprising:
    chip or particle detection means for detecting the quantity of collected chips or particles, whereby whether the drilling tool is intact or broken is detected from the quantity of collected and detected chips or particles.

* * * * *

UNITED STATES PATENT AND TRADEMARK OFFICE
CERTIFICATE OF CORRECTION

PATENT NO. : 4,420,685

DATED : December 13, 1983

INVENTOR(S) : Tamio OHTANI et al

It is certified that error appears in the above-identified patent and that said Letters Patent is hereby corrected as shown below:

On the Title Page, lefthand column:

"[30]    Foreign Application Priority Data

Aug. 24, 1979 [JP]    Japan ................54-115795" should be deleted in its entirety.

*Signed and Sealed this*

*Fifteenth* Day of *May 1984*

[SEAL]

*Attest:*

GERALD J. MOSSINGHOFF

*Attesting Officer*    *Commissioner of Patents and Trademarks*